United States Patent
Niwa

(10) Patent No.: US 12,221,002 B2
(45) Date of Patent: Feb. 11, 2025

(54) CHARGING SYSTEM AND CHARGING DEVICE

(71) Applicant: TOYOTA JIDOSHA KABUSHIKI KAISHA, Toyota (JP)

(72) Inventor: Yamato Niwa, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 411 days.

(21) Appl. No.: 17/722,816

(22) Filed: Apr. 18, 2022

(65) Prior Publication Data
US 2022/0379754 A1 Dec. 1, 2022

(30) Foreign Application Priority Data

May 26, 2021 (JP) .................................. 2021-088399

(51) Int. Cl.
| | |
|---|---|
| *B60L 53/302* | (2019.01) |
| *B60L 53/31* | (2019.01) |
| *F24F 7/06* | (2006.01) |
| *H02J 7/00* | (2006.01) |

(52) U.S. Cl.
CPC ............. *B60L 53/302* (2019.02); *B60L 53/31* (2019.02); *F24F 7/06* (2013.01); *H02J 7/0042* (2013.01)

(58) Field of Classification Search
CPC ............................... B60L 53/302; B60L 53/31
USPC ........................................................ 320/109
See application file for complete search history.

(56) References Cited

U.S. PATENT DOCUMENTS

| | | | |
|---|---|---|---|
| 11,479,135 B2 * | 10/2022 | Price .................... | B60L 53/305 |
| 2013/0307477 A1 * | 11/2013 | Reinschke ............. | B60L 53/30 |
| | | | 320/109 |
| 2015/0306974 A1 * | 10/2015 | Mardall ............. | H01M 10/625 |
| | | | 429/120 |
| 2018/0257501 A1 * | 9/2018 | Hähre .................... | B60L 53/57 |
| 2018/0370374 A1 * | 12/2018 | Götz ...................... | H02J 7/04 |
| 2019/0106004 A1 * | 4/2019 | Heyne ................. | B60L 53/14 |
| 2020/0317071 A1 * | 10/2020 | Hakenberg ........... | B60L 53/302 |
| 2021/0252989 A1 * | 8/2021 | Price ...................... | B60L 53/31 |
| 2021/0325090 A1 * | 10/2021 | Pfütze-Rämsch ....... | F24T 10/17 |
| 2023/0187111 A1 * | 6/2023 | Daga ................... | B60L 53/302 |
| | | | 307/104 |
| 2023/0322106 A1 * | 10/2023 | Lopez ................. | B60L 53/16 |
| | | | 320/109 |
| 2024/0255103 A1 * | 8/2024 | Bedell .................. | F25D 19/00 |
| 2024/0286508 A1 * | 8/2024 | Boettigheimer ....... | H01F 27/22 |

FOREIGN PATENT DOCUMENTS

JP            5475407 B2       4/2014

* cited by examiner

*Primary Examiner* — Jack Chiang
*Assistant Examiner* — Suchin Parihar
(74) *Attorney, Agent, or Firm* — Dinsmore & Shohl LLP

(57) ABSTRACT

A charging system includes three charging stands, an exhaust heat pipe provided underground, and a heat utilization device that utilizes exhaust heat. The charging stand has an opening and an exhaust heat port. The exhaust heat port is connected to an exhaust heat pipe. Cooling air taken in through the opening exchanges heat with a power supply circuit of the charging stand, and is then discharged from the exhaust heat port into the exhaust heat pipe. The temperature of the cooling air discharged into the exhaust heat pipe is raised by heat exchange with the power supply circuit. The cooling air flows through the exhaust heat pipe and is supplied to a heat utilization device.

6 Claims, 3 Drawing Sheets

CHARGING SYSTEM AND CHARGING DEVICE

CROSS-REFERENCE TO RELATED APPLICATION

This application claims priority to Japanese Patent Application No. 2021-088399 filed on May 26, 2021, incorporated herein by reference in its entirety.

BACKGROUND

1. Technical Field

The disclosure relates to a charging system and a charging device.

2. Description of Related Art

Charging equipment for charging a power storage device installed on a vehicle, etc. is installed on a parking lot or a sidewalk, for example, but the charging equipment occupies the installation space and may interfere with walking and traveling of vehicles. Thus, a technology for storing charging equipment under the ground, such as a charging pole disclosed in Japanese Patent No. 5475407, has been developed.

SUMMARY

The charging equipment stored under the ground is raised from the ground during use, and stored under the ground when the use is completed. Since the charging equipment is stored under the ground, heat generated during charging of the power storage device is likely to be trapped in the charging equipment, and its heat dissipation may become a problem. Also, it is desirable, in terms of effective utilization of energy, to use the heat generated through charging of the power storage device for some purpose.

The disclosure provides a charging system that effectively utilizes heat (exhaust heat) dissipated, while enhancing heat dissipation of a charging device.

A charging system according to one aspect of the disclosure is a charging system for charging a power storage device installed on a vehicle. The charging system includes a charging device that is movable and configured to be switchable between a state in which the charging device is stored underground and a state in which the charging device is exposed aboveground, an exhaust heat pipe provided underground, and a heat utilization device that is connected to the exhaust heat pipe, and is configured to utilize exhaust heat supplied from the exhaust heat pipe. The charging device includes a connecting device that is electrically connectable with the power storage device, a power supply circuit configured to supply electric power to the connecting device, and an exhaust heat port connected to the exhaust heat pipe.

With the above configuration, the exhaust heat port of the charging device is connected to the exhaust heat pipe. Thus, heat generated by the power supply circuit can be discharged from the exhaust heat port into the exhaust heat pipe. As a result, the heat dissipation of the charging device can be enhanced. Also, the heat utilization device that utilizes exhaust heat is connected to the exhaust heat pipe. Since the exhaust heat can be utilized by the heat utilization device, the exhaust heat discharged from the exhaust heat port into the exhaust heat pipe can be effectively utilized.

In the above charging system, the charging device may further include an air inlet, and a cooling fan configured to take in cooling air through the air inlet and feed the cooling air to the exhaust heat port.

In this case, the power supply circuit may be located on a path through which the cooling air flows from the air inlet to the exhaust heat port.

With the above configuration, the cooling air taken in through the air inlet flows to the exhaust heat port, so that the power supply circuit can be appropriately cooled with the cooling air.

In the above charging system, the exhaust heat pipe may include an air blowing device configured to cause cooling air to flow in a direction from a connection point of the exhaust heat pipe and the exhaust heat port toward the heat utilization device. The charging device may further include heat dissipation fins attached to the power supply circuit, and at least a part of the heat dissipation fins may be exposed to the exhaust heat pipe through the exhaust heat port.

With the above configuration, at least a part of the heat dissipation fins attached to the power supply circuit is exposed to the exhaust heat pipe through the exhaust heat port, so that the heat dissipation fins can be cooled with the cooling air flowing through the exhaust heat pipe. Thus, the power supply circuit can be appropriately cooled.

A charging device according to another aspect of the disclosure is a charging device that is movable and configured to be switchable between a state in which the charging device is stored underground and a state in which the charging device is exposed aboveground. The charging device includes a connecting device that is electrically connectable with a power storage device installed on a vehicle, a power supply circuit configured to supply electric power to the connecting device, and an exhaust heat port. The exhaust heat port is connected to an exhaust heat pipe provided underground. A heat utilization device that utilizes exhaust heat supplied from the exhaust heat pipe is connected to the exhaust heat pipe.

According to the disclosure, it is possible to effectively utilize heat (exhaust heat) dissipated, while enhancing the heat dissipation of the charging device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
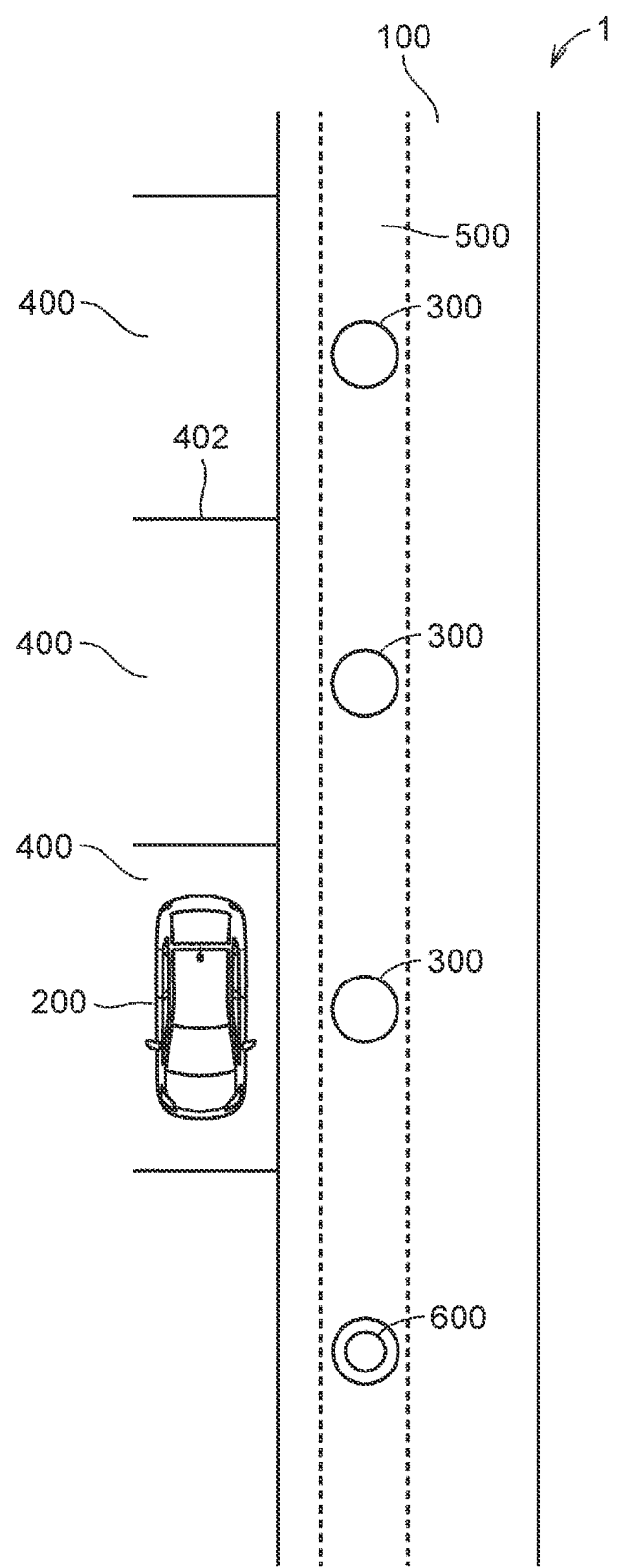
FIG. 1 is a view showing an example of the layout of a charging system according to a first embodiment.

Some embodiments of the disclosure will be described in detail with reference to the drawings. In the drawings, the same reference signs are assigned to the same or corresponding portions, of which description will not be repeated.

First Embodiment

FIG. 1 shows an example of the layout of a charging system 1 according to a first embodiment. As illustrated in FIG. 1, a plurality of parking spaces 400 is provided in a parking lot, and an electrified vehicle 200 is parked in one of the parking spaces 400.

In FIG. 1, the parking spaces 400 are set in a direction of parallel parking by partition lines 402. In a space 100 adjacent to the parking spaces 400, there are three charging stands 300 each configured to allow plug-in charging of the electrified vehicle 200. The charging system 1 of the first embodiment includes three charging stands 300. The charging stands 300 are provided for the respective parking spaces 400. In this connection, the number of the charging stands 300 included in the charging system 1 is not limited to three. The number of the charging stand(s) 300 included in the charging system 1 may be one, or two, or four or more. The charging stand 300 corresponds to the "charging device" according to the disclosure.

The charging stand 300 is configured to be able to be raised and lowered (moved in the vertical direction) between a "stored state" in which the charging stand 300 is stored underground and an "exposed state" in which it is exposed aboveground. In the stored state, the charging stand 300 is lowered such that its upper end is at substantially the same level as the ground. In the exposed state, the charging stand 300 is raised such that its upper end is at a predetermined level above the ground.

The charging system 1 further includes an exhaust heat pipe 500 (FIG. 2) and a heat utilization device 600. The exhaust heat pipe 500 is provided under the ground. The exhaust heat pipe 500 is located along the line of the charging stands 300. Namely, the charging stands 300 are installed above the exhaust heat pipe 500 provided under the ground. Like the charging stands 300, the heat utilization device 600 is also installed above the exhaust heat pipe 500. The exhaust heat pipe 500 and the heat utilization device 60 will be described in detail later.

Figure 2:
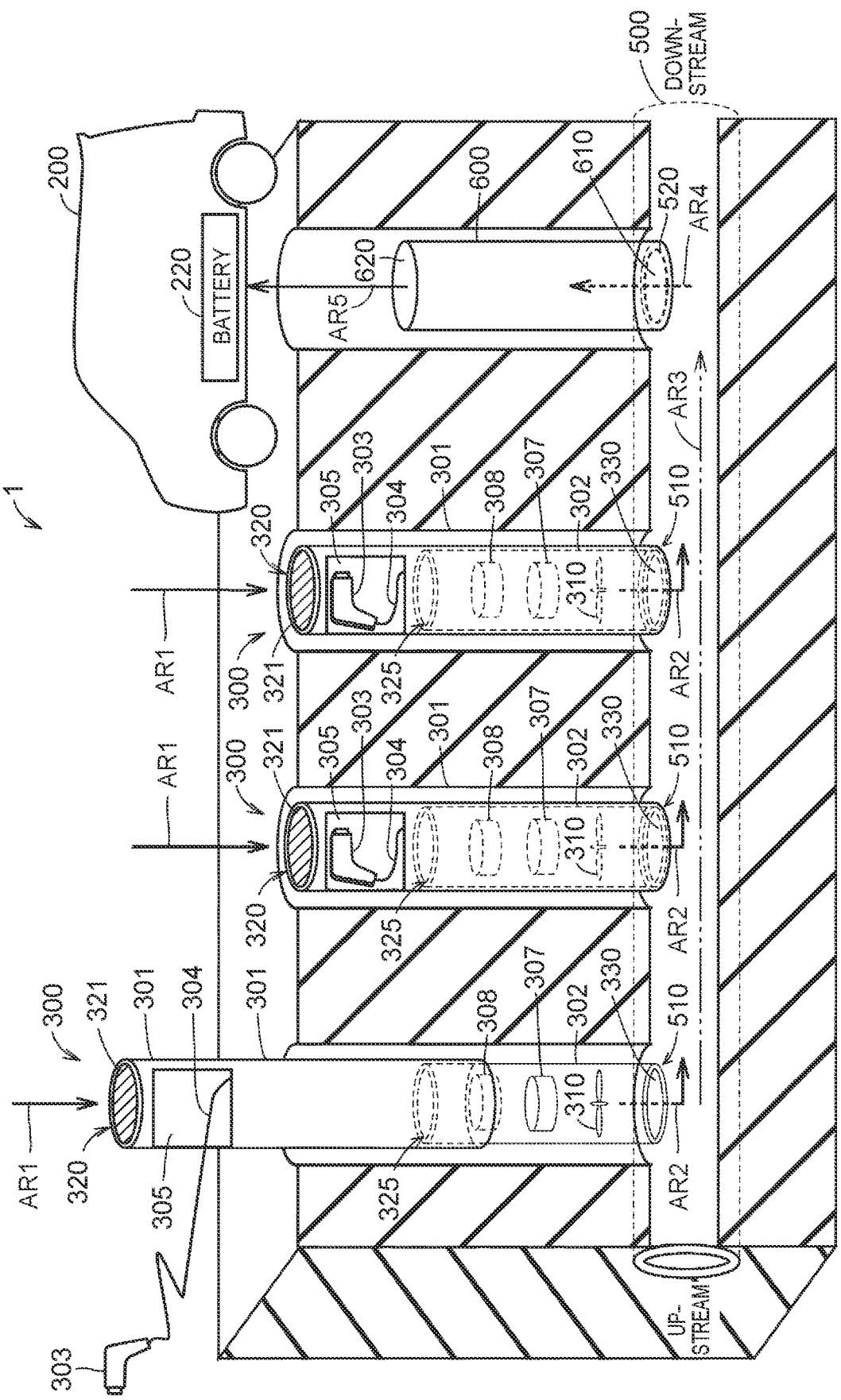
FIG. 2 is a cross-sectional perspective view of the charging system according to the first embodiment.

FIG. 2 is a cross-sectional perspective view of the charging system 1 according to the first embodiment. In FIG. 2, three charging stands 300 are provided, as in FIG. 1. In FIG. 2, the charging stand 300 located on the left-hand side, among the three charging stands 300, is in the exposed state. In FIG. 2, the charging stands 300 located at the center and on the right-hand side, among the three charging stands 300, are in the stored state.

Each of the charging stands 300 has a cylindrical case, for example. Recesses are formed in the ground, and each charging stand 300 is fixed to the exhaust heat pipe 500 provided underground, at the bottom of the corresponding recess. Each of the recesses is formed with a predetermined clearance between the recess and the outer circumferential surface of the case of the corresponding charging stand 300. The depth of the recess is substantially equal to the length of the charging stand 300 in the stored state as measured in the vertical direction.

The charging stand 300 includes a movable portion 301 and a fixed portion 302. A storage space 305 in which a connector 303 can be stored is formed in an upper part of the movable portion 301. One end of a cable 304 is connected to the connector 303. The other end of the cable 304 is connected to a power supply circuit 307. The power supply circuit 307 includes a power conversion circuit (not shown), and is configured to supply electric power to the movable portion 301 (more specifically, the connector 303 and the cable 304) when it is supplied with alternating-current (AC) power from a power supply (not shown). The power supplied from the power supply circuit 307 to the movable portion 301 may be AC power or direct-current (DC) power.

The power supply is, for example, an alternating-current (AC) power source composed of a commercial power supply, etc.

The cable 304 has an extensible portion that is shaped with a curling portion or a structurally extensible portion having a take-up structure. The cable 304 is configured to be able to extend to an inlet (not shown) of the electrified vehicle 200 parked in the parking space 400 (FIG. 1) when the connector 303 is taken out.

An opening 320 is provided in the upper face of the movable portion 301. The opening 320 is provided with a filter 321 for curbing or preventing entry of foreign matter into the charging stand 300. With this arrangement, foreign matter can be prevented from entering the interior of the charging stand 300.

The fixed portion 302 includes a lifting device (not shown) that raises and lowers the movable portion 301 in the vertical direction, the power supply circuit 307 as described above, a controller 308 that controls operation of the lifting device, a movement amount sensor (not shown), and a cooling fan 310. Like the movable portion 301, an opening 325 is provided in the upper face of the fixed portion 302. In the first embodiment, a filter for preventing entry of foreign matter is not provided in the opening 325. However, a filter may also be provided in the opening 325, as in the opening 320. Thus, foreign matter can be further prevented from entering the interior of the fixed portion 302. The opening 320 and the opening 325 correspond to one example of the "air inlet" according to the disclosure.

The lifting device includes an actuator (not shown) that raises and lowers the movable portion 301. The lifting device raises and lowers the movable portion 301 between the stored state and the exposed state. Various mechanisms may be employed for the lifting device. More specifically, the lifting device may have a rack and pinion type mechanism, a mechanism using a hydraulic cylinder, or a magnetic mechanism. The rack and pinion type mechanism raises and lowers the movable portion 301 by rotating a pinion gear that meshes with a rack gear fixed on the movable portion 301, by use of an electric actuator. The mechanism using the hydraulic cylinder raises and lowers the movable portion 301, by fixing a rod connected to a piston to the movable portion 301, and increasing and reducing the hydraulic pressure supplied to a cylinder body fixed to the fixed portion 302. The magnetic mechanism raises and lowers the movable portion 301 by generating repulsive force, using magnetic force, between the movable portion 301 and the fixed portion 302.

The lifting device is configured such that the movable portion 301 is not lowered beyond a position corresponding to the stored state, by a stopper mechanism or the like. The lifting device is also configured such that the movable portion 301 is not raised beyond a position corresponding to the exposed state.

The movement amount sensor detects the movement amount of the movable portion 301. The movement amount sensor detects the amount of lift of the movable portion 301 by the lifting device as the movement amount of the movable portion 301, for example. The movement amount sensor sends a signal indicating the detected movement amount of the movable portion 301 to the controller 308. The movement amount sensor may detect a state amount, such as the amount of operation of an actuator, equivalent to the lift amount, and the controller 308 may obtain the lift amount from the detected state amount.

The controller 308 includes a central processing unit (CPU) (not shown), a memory (not shown) composed of a read-only memory (ROM) and a random access memory (RAM), etc., and a communication unit (not shown) that can communicate with external devices. The communication unit is configured to be able to communicate various types of information, etc. with external devices of the charging stand 300. The communication unit is configured to be able to communicate with, for example, a communication device (not shown) of the electrified vehicle 200 for which a battery is to be charged using the charging stand 300, a communication terminal (not shown) possessed by the user of the electrified vehicle 200, a management server (not shown) that manages the charging stand 300, and/or another charging stand or stands 300. The controller 308 controls electric devices (e.g., the lifting device, power supply circuit 307, and cooling fan 310) provided in the charging stand 300, based on information stored in the memory, information received via the communication unit, and/or information obtained from sensors (not shown), etc. The configuration to perform these controls is not limited to the configuration in which software processing is performed by the CPU, but may be the configuration constructed by dedicated hardware (electronic circuits).

An exhaust heat port 330 is provided in the bottom of the fixed portion 302. Also, openings 510 are provided at given intervals in the exhaust heat pipe 500. In the first embodiment, three openings 510 are provided in the exhaust heat pipe 500. The exhaust heat port 330 provided in the bottom of the fixed portion 302 is connected to a corresponding one of the openings 510 provided in the exhaust heat pipe 500.

The cooling fan 310 receives electric power from the power supply circuit 307, for example, and is driven according to a control signal from the controller 308. The cooling fan 310 is an air intake type fan. More specifically, the cooling fan 310 is configured to feed outside air (cooling air) in the direction from the opening 320 to the exhaust heat port 330. When the cooling fan 310 is driven, the outside air (cooling air) is drawn into the charging stand 300 through the opening 320, as indicated by arrow AR1 in FIG. 2. The cooling air taken into the charging stand 300 flows toward the exhaust heat port 330. Various devices including the power supply circuit 307 and the controller 308 are located on a path from the opening 320 to the exhaust heat port 330. The cooling air cools the power supply circuit 307, controller 308, etc., by exchanging heat with various devices including the power supply circuit 307 and controller 308 located on the above-mentioned path. The cooling air of which the temperature has been raised by heat exchange is discharged into the exhaust heat pipe 500, via the exhaust heat port 330 and the corresponding opening 510. In the following description, the cooling air discharged from the exhaust heat port 330 will also be referred to as "exhaust heat air".

The controller 308 causes the cooling fan 310 to be driven when a predetermined condition is satisfied. As the predetermined condition, (1) a condition that "the charging stand 300 is in use", (2) a condition that "a predetermined time has not passed since the charging stand 300 was used", or (3) a condition that "the charging stand 300 is in use, or a predetermined time has not passed since the charging stand 300 was used", may be employed. The charging stand 300 is in use, for example, in a condition where the connector 303 is connected to an inlet of the electrified vehicle 200, and electric power is supplied from the charging stand 300 to the electrified vehicle 200. The predetermined time is set as a length of time required to lower the temperature of the power supply circuit 307 to a level lower than a given temperature. The predetermined time is set based on, for example, the charging power supplied from the charging stand 300 to the electrified vehicle 200 and the power supply time, the cooling capability of the cooling fan 310, the outside air temperature, etc. The predetermined time may be set in advance based on the results of experiments or simulation. Also, a condition that "the temperature of the power supply circuit 307 is equal to or higher than a threshold temperature" may be employed as the predetermined condition. In this case, the fixed portion 302 further includes a temperature sensor that detects the temperature of the power supply circuit 307, and outputs the result of the detection to the controller 308.

The exhaust heat air discharged into the exhaust heat pipe 500 through the openings 510 flows from the left-hand side (upstream) to the right-hand side (downstream) in FIG. 2, as indicated by arrows AR2. The flow of the exhaust heat air from upstream to downstream may be achieved by the structure of the openings 510 and around the openings 510. More specifically, for example, a shielding plate (damper) having a check valve structure may be provided in an upstream section of the exhaust heat pipe 500, such that the exhaust heat air can flow from upstream to downstream, while the exhaust heat air is inhibited from flowing from downstream to upstream. Also, the flow of the exhaust heat air from upstream to downstream may be achieved by providing a fan or a blower inside the exhaust heat pipe 500. In FIG. 2, arrow AR3 indicates the overall flow of the exhaust heat air.

An opening 520 is provided in a downstream section of the exhaust heat pipe 500. In the exhaust heat pipe 500, the opening 520 is located downstream of the openings 510 to which the exhaust heat ports 330 of the charging stands 300 are connected. A heat utilization device 600 is connected to the opening 520. The heat utilization device 600 according to this embodiment is a temperature raising device for raising the temperature of the battery 220 of the electrified vehicle 200, by using the exhaust heat air discharged from each charging stand 300. The heat utilization device 600 includes an inlet 610 and an outlet 620. The heat utilization device 600 takes in the exhaust heat air flowing in the exhaust heat pipe 500, from the inlet 610, as indicated by arrow AR4. Then, the heat utilization device 600 discharges the exhaust heat air thus taken in, from the outlet 620. The heat utilization device 600 may include a device for further raising the temperature of the exhaust heat air taken in from the inlet 610.

The battery 220 of the electrified vehicle 200 is located on the lower surface of a floor panel (not shown). For example, the electrified vehicle 200 is parked above the heat utilization device 600, so that the temperature of the battery 220 can be raised by the exhaust heat air discharged from the outlet 620 of the heat utilization device 600. When the battery 220 is at a low temperature level at the start of use of the electrified vehicle 200, for example, it is effective to use the heat utilization device 600.

As described above, each of the charging stands 300 included in the charging system 1 of the first embodiment has the opening 320 and the exhaust heat port 330. The exhaust heat pipe 500 is provided under the ground, and the exhaust heat ports 330 of the charging stands 300 are connected to the corresponding openings 510 of the exhaust heat pipe 500. When the cooling fan 310 is driven under control of the controller 308 of the charging stand 300, cooling air is drawn into the charging stand 300 through the opening 320. The cooling air exchanges heat with various devices including the power supply circuit 307 and the controller 308 of the charging stand 300. As a result, the devices including the power supply circuit 307 and the controller 308 are cooled. The cooling air (exhaust heat air) that has exchanged heat with various devices including the power supply circuit 307 and the controller 308 is discharged into the exhaust heat pipe 500 through the exhaust heat port 330. The charging stand 3M is stored under the ground after it is used to charge the battery 220 of the electrified vehicle 200, therefore, heat generated by charging is likely to be trapped. In particular, the amount of heat generated by the power supply circuit 307 is large, and it is thus important to cool the power supply circuit 307 appropriately. As described above, the exhaust heat pipe 500 is provided under the ground, and the cooling air taken in from the opening 320 of the charging stand 300 is discharged into the exhaust heat pipe 500 through the exhaust heat port 330, so that the power supply circuit 307 included in the charging stand 300 can be appropriately cooled. With the configuration of the charging system 1 according to the first embodiment, the power supply circuit 307 can be appropriately cooled even when the charging stand 300 is in the stored state. For example, even when the charging stand 300 is placed in the stored state immediately after the charging stand 300 is used to charge the battery 220 of the electrified vehicle 200, the power supply circuit 307 can be cooled, and heat can be made less likely or unlikely to be trapped inside the charging stand 300. Namely, heat dissipation of the charging stand 300 can be enhanced.

Furthermore, the charging system 1 is provided with the heat utilization device 600. The heat utilization device 600 is connected to the opening 520 provided downstream of the openings 510 to which the exhaust heat ports 330 of the charging stands 300 are connected. The heat utilization device 600 takes in the exhaust heat air discharged into the exhaust heat pipe 500 from the exhaust heat ports 330 of the charging stands 300, and raises the temperature of the battery 220 of the electrified vehicle 200 parked above the heat utilization device 600. Thus, in the charging system 1, the exhaust heat generated by cooling the charging stands 300 can be effectively utilized.

Second Embodiment

Figure 3:
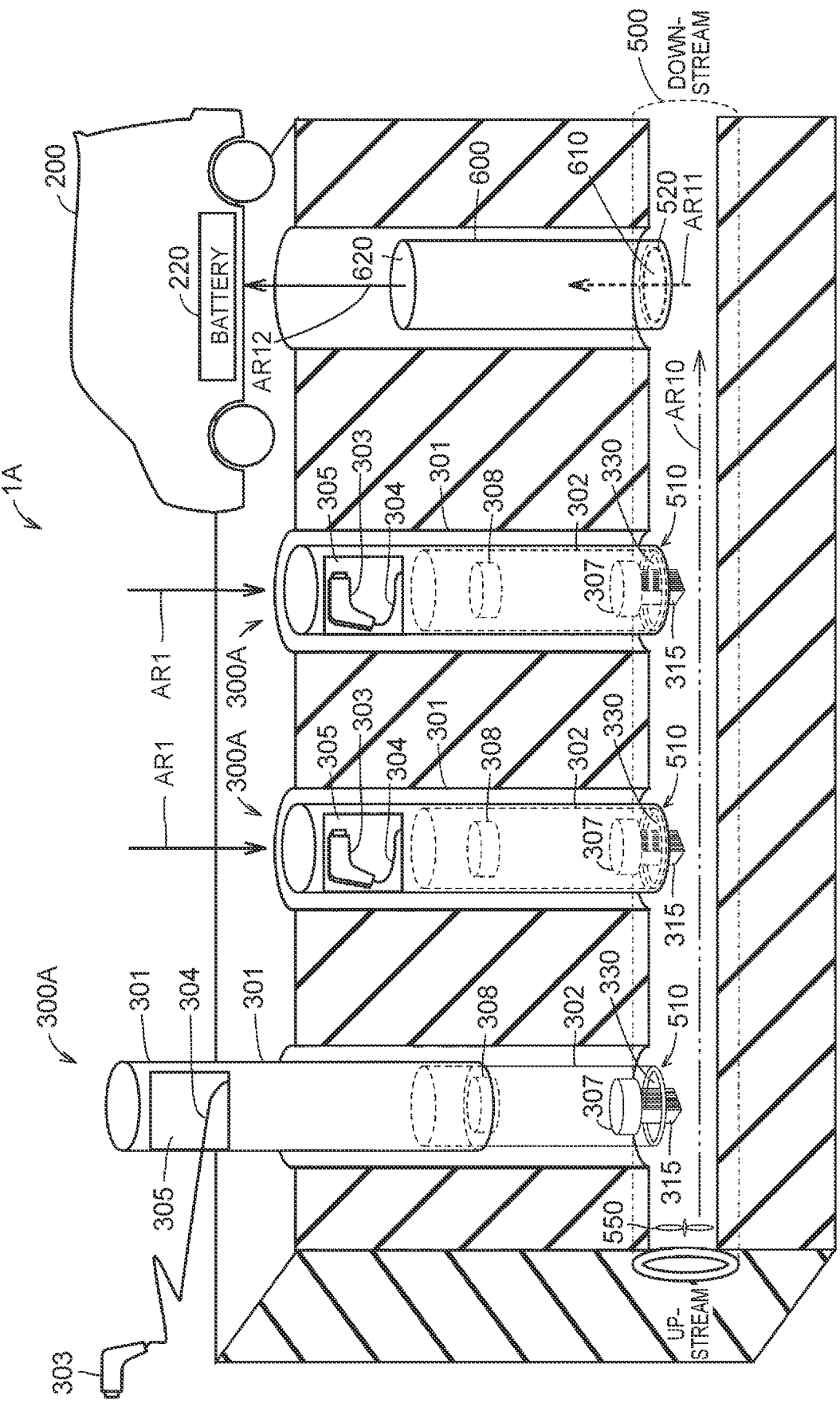
FIG. 3 is a cross-sectional perspective view of a charging system according to a second embodiment.

FIG. 3 is a cross-sectional perspective view of a charging system 1A according to a second embodiment. The charging system 1A of the second embodiment includes three charging stands 300A, exhaust heat pipe 500 and heat utilization device 600.

The charging stand 300A is different from the charging stand 300 of the first embodiment in that heat dissipation fins 315 are provided in place of the cooling fan 310. Furthermore, the charging stand 300A is different from the charging stand 300 in that the opening 320, filter 321, and opening 325 are deleted. The other configuration of the charging stand 300A is similar to that of the charging stand 300 of the first embodiment; therefore, the other configuration will not be repeatedly described.

The heat dissipation fins 315 are attached to the power supply circuit 307. The heat dissipation fins 315 are configured to transfer heat of the power supply circuit 307. The power supply circuit 307 and the heat dissipation fins 315 are located such that a part of the heat dissipation fins 315 is exposed to the inside of the exhaust heat pipe 500 through the exhaust heat port 330 and the opening 510.

A fan 550 is provided in an upstream section of the exhaust heat pipe 500. The fan 550 is an air intake type fan. When the fan 550 is driven, outside air (cooling air) is drawn from the outside of the exhaust heat pipe 500 into the exhaust heat pipe 500. The cooling air drawn into the exhaust heat pipe 500 flows from upstream to downstream as indicated by arrow AR10. The cooling air flowing inside the exhaust heat pipe 500 exchanges heat with the heat dissipation fins 315 that are partially exposed to the inside of the exhaust heat pipe 500 through the opening 510. As a result, the heat dissipation fins 315 are cooled, and the power supply circuit 307 that transfers heat to the heat dissipation fins 315 is also cooled.

The cooling air (exhaust heat air) of which the temperature was raised by heat exchange with the heat dissipation fins 315 is utilized by the heat utilization device 600, in the same manner as in the first embodiment. In the meantime, a blower may be used in place of the fan 550. The fan 550 corresponds to an example of the "air blowing device" according to the disclosure.

As described above, in the charging system 1A of the second embodiment, the heat dissipation fins 315 are attached to the power supply circuit 307. Then, the heat dissipation fins 315 are partially exposed to the inside of the exhaust heat pipe 500. In the exhaust heat pipe 500, the cooling air drawn into the exhaust heat pipe 50) by the fan 550 provided inside the exhaust heat pipe 500 flows from upstream to downstream. The cooling air drawn into the exhaust heat pipe 500 exchanges heat with the heat dissipation fins 315. As a result, the heat dissipation fins 315 can be cooled, and the power supply circuit 307 included in the charging stand 300A can be appropriately cooled. With the configuration of the charging system 1A according to the second embodiment, too, heat can be made likely or unlikely to be trapped inside the charging stand 300A. Namely, heat dissipation of the charging stand 300A can be enhanced.

Also, as in the first embodiment, the heat utilization device 600 raises the temperature of the battery 220 of the electrified vehicle 200 parked above the heat utilization device 600, by using the exhaust heat air. Namely, in the charging system 1A, too, the exhaust heat generated through cooling of the charging stand 300A can be effectively utilized.

MODIFIED EXAMPLES

In the first and second embodiments, the heat utilization device 600 is the temperature raising device that raises the temperature of the battery 220 of the electrified vehicle 200. However, the heat utilization device 600 is not limited to the temperature raising device for raising the temperature of the battery 220. For example, the heat utilization device 600 may be a warm air supply device that supplies warm air to a building. In this case, the outlet 620 of the heat utilization device 600 is connected to a pipe through which the air circulates in the building. The heat utilization device 600 takes in exhaust heat air flowing inside the exhaust heat pipe 500, and discharges it from the outlet 620, in the same manner as in the first and second embodiments. In this manner, the warm air can be supplied to the building.

The heat utilization device 600 may also be a snow-melting device that melts snow piled up on a road. In this case, the outlet 620 of the heat utilization device 600 is connected to a pipe provided under the road. The heat utilization device 600 takes in exhaust heat air flowing inside the exhaust heat pipe 500, and discharges it from the outlet 620, in the same manner as in the first and second embodiments. In this manner, the exhaust heat air (warm air) is supplied to the pipe provided under the road, and the warm air can melt the snow piled up on the road.

The heat utilization device 600 may also be a conversion device that converts exhaust heat into electricity. The conversion device generates the flow of heat, for example, and converts the heat into electricity. For example, the heat utilization device 600 may store the electricity resulting from the conversion, in a power storage device, or the like.

In the above three examples, too, the exhaust heat generated by cooling in the charging stands 300, 300A can be effectively utilized.

The embodiments and modified examples disclosed herein should be considered illustrative in all respects and not limiting. The scope of the disclosure is indicated by the appended claims rather than the above description, and is intended to include all changes within the meaning and scope of the claims and equivalents thereof.

What is claimed is:

1. A charging system for charging a power storage device installed on a vehicle, the charging system comprising:
   a charging device that is movable and configured to be switchable between a state in which the charging device is stored underground and a state in which the charging device is exposed aboveground;
   an exhaust heat pipe provided underground; and
   a heat utilization device that is connected to an opening of the exhaust heat pipe underground, and is configured to utilize exhaust heat supplied from the exhaust heat pipe and raise a temperature of a battery of the vehicle,
   wherein the charging device includes a connecting device that is electrically connectable with the power storage device, a power supply circuit configured to supply electric power to the connecting device, an exhaust heat port connected to the exhaust heat pipe, a cooling fan, and a central processing unit configured to cause the cooling fan to be driven in accordance with a control signal and in response to satisfying a predetermined condition, the predetermined condition including the charging device being in use or a predetermined time not passing since use of the charging device, the predetermined time being set as a length of time to lower a temperature of the power supply circuit to a level lower than a predetermined temperature.

2. The charging system according to claim 1, wherein the charging device further includes an air inlet, and the cooling fan configured to take in cooling air through the air inlet and feed the cooling air to the exhaust heat port.

3. The charging system according to claim 2, wherein the power supply circuit is located on a path through which the cooling air flows from the air inlet to the exhaust heat port.

4. The charging system according to claim 1, wherein:
   the exhaust heat pipe includes an air blowing device configured to cause cooling air to flow in a direction from a connection point of the exhaust heat pipe and the exhaust heat port toward the heat utilization device; and
   the charging device further includes heat dissipation fins attached to the power supply circuit, and at least a part of the heat dissipation fins is exposed to the exhaust heat pipe through the exhaust heat port.

5. A charging device that is movable and configured to be switchable between a state in which the charging device is stored underground and a state in which the charging device is exposed aboveground, the charging device comprising:
   a connecting device that is electrically connectable with a power storage device installed on a vehicle;
   a power supply circuit configured to supply electric power to the connecting device;
   an exhaust heat port;
   a cooling fan;
   and a central processing unit configured to cause the cooling fan to be driven in accordance with a control signal and in response to satisfying a predetermined condition, the predetermined condition including the charging device being in use or a predetermined time not passing since use of the charging device, the predetermined time being set as a length of time to lower a temperature of the power supply circuit to a level lower than a predetermined temperature;
   wherein the exhaust heat port is connected to an exhaust heat pipe provided underground, and a heat utilization device that utilizes exhaust heat supplied from the exhaust heat pipe and raises a temperature of a battery of the vehicle is connected to an opening of the exhaust heat pipe underground.

6. The charging system according to claim 1, wherein the charging device further includes a movable portion and a fixed portion, the fixed portion including the power supply circuit and the central processing unit.

* * * * *